United States Patent
Wallmeier et al.

(10) Patent No.: US 11,590,796 B2
(45) Date of Patent: Feb. 28, 2023

(54) WHEEL HUB, A BRAKE DISC, A FASTENING MEANS, AND A SYSTEM FORMED OF WHEEL HUB, BRAKE DISC AND FASTENING MEANS

(71) Applicant: SAF-HOLLAND GmbH, Bessenbach (DE)

(72) Inventors: Stefan Wallmeier, Goldbach (DE); Ralf Aumüller, Frankfurt (DE)

(73) Assignee: SAF-HOLLAND GmbH, Bessenbach (DE)

( * ) Notice: Subject to any disclaimer, the term of this patent is extended or adjusted under 35 U.S.C. 154(b) by 410 days.

(21) Appl. No.: 16/628,575

(22) PCT Filed: Jul. 5, 2018

(86) PCT No.: PCT/EP2018/068243
§ 371 (c)(1),
(2) Date: Jan. 3, 2020

(87) PCT Pub. No.: WO2019/015983
PCT Pub. Date: Jan. 24, 2019

(65) Prior Publication Data
US 2020/0180357 A1 Jun. 11, 2020

(30) Foreign Application Priority Data
Jul. 18, 2017 (DE) .................... 10 2017 116 134.1

(51) Int. Cl.
*F16D 65/12* (2006.01)
*B60B 27/00* (2006.01)
*F16D 65/02* (2006.01)

(52) U.S. Cl.
CPC ........ *B60B 27/0052* (2013.01); *F16D 65/123* (2013.01); *F16D 2065/1384* (2013.01); *F16D 2065/1392* (2013.01)

(58) Field of Classification Search
CPC ........... F16D 65/12; F16D 65/123–128; B60B 27/0052
(Continued)

(56) References Cited

U.S. PATENT DOCUMENTS 6,139,215 A * 10/2000 Kuhne .................. F16D 65/123
403/336
6,450,585 B1 9/2002 Kocksiek
(Continued)

FOREIGN PATENT DOCUMENTS

CN 106870605 A 4/2021
DE 19639729 A1 4/1998
(Continued)

OTHER PUBLICATIONS

European Patent Office; International Search Report; dated Oct. 18, 2018.

*Primary Examiner* — Christopher P Schwartz
(74) *Attorney, Agent, or Firm* — Price Heneveld LLP (57) ABSTRACT

A wheel hub is configured to rotate about an axis of rotation during operation, and includes a brake disk abutment surface against which a brake disk bears in an installed state, and a wheel-hub-side contact surface which is offset in an axial direction with respect to the brake disk abutment surface and which runs obliquely with respect to the axis of rotation and against which at least a part of a fastening assembly, by which the brake disk is fastenable or fastened to the wheel hub, bears in the installed state.

18 Claims, 6 Drawing Sheets

(58) Field of Classification Search
USPC .............. 188/18 A, 218 XL; 301/105.1
See application file for complete search history.

(56) References Cited

U.S. PATENT DOCUMENTS

| | | | | |
|---|---|---|---|---|
| 6,880,682 | B2* | 4/2005 | Gotti | B60B 27/001 |
| | | | | 188/218 XL |
| 7,044,563 | B2 | 5/2006 | Suzuki | |
| 7,780,243 | B2* | 8/2010 | Lippis | F16D 65/12 |
| | | | | 188/218 XL |
| 8,292,046 | B2* | 10/2012 | Masoni | F16D 65/12 |
| | | | | 188/218 XL |
| 8,985,889 | B2* | 3/2015 | Mahn | F16D 1/05 |
| | | | | 403/374.1 |
| 2002/0003071 | A1 | 1/2002 | Torii et al. | |
| 2004/0041461 | A1* | 3/2004 | Meeker | F16D 65/12 |
| | | | | 301/105.1 |
| 2015/0176667 | A1 | 6/2015 | Misumi et al. | |
| 2016/0025165 | A1* | 1/2016 | Plantan | F16D 65/123 |
| | | | | 188/218 XL |

FOREIGN PATENT DOCUMENTS

| | | | |
|---|---|---|---|
| DE | 69807957 | T2 | 8/1998 |
| DE | 10133985 | A1 | 4/2001 |
| DE | 10246939 | A1 | 5/2004 |
| DE | 102012001601 | A1 | 10/2012 |
| DE | 102015016036 | A1 | 6/2017 |
| DE | 102017106461 | A1 | 9/2018 |
| EP | 2647891 | A1 | 10/2013 |
| EP | 2957432 | A1 | 12/2015 |
| EP | 3179129 | A1 | 6/2017 |
| JP | 2005289147 | A1 | 10/2005 |

* cited by examiner

WHEEL HUB, A BRAKE DISC, A FASTENING MEANS, AND A SYSTEM FORMED OF WHEEL HUB, BRAKE DISC AND FASTENING MEANS

BACKGROUND OF THE INVENTION

The present invention relates to a wheel hub, a brake disk, a fastening assembly, and a system formed of a wheel hub, of a brake disk and of a fastening assembly.

Wheel hubs are well known from the prior art. They serve for the attachment of a wheel to an axle element, for example to an axle of a utility vehicle. Here, brake disks are commonly connected rotationally conjointly to the wheel hub. The brake disks are typically fixed axially by means of screws engaging into the wheel hub. This axial fixing by means of the screw leads here to a non-positively locking connection at an interface between the wheel hub and the brake disk bearing against the wheel hub. In order to withstand the loads that arise during operation, in the prior art, relatively high demands are placed on a fastening assembly by which the brake disk is fixed axially to the wheel hub.

In view of the described prior art, it is therefore an object of the present invention to provide an improved wheel hub, with which high operational reliability can be ensured and greater braking torques can be accommodated.

SUMMARY OF THE INVENTION

According to the invention, a wheel hub is provided, in particular for a utility vehicle, which wheel hub rotates about an axis of rotation during operation, comprising a brake disk abutment surface against which a brake disk bears in an installed state, and a wheel-hub-side contact surface which is offset in an axial direction with respect to the brake disk abutment surface and which runs obliquely with respect to the axis of rotation, that is to say at an angle not equal to 0°, 90° or 180° with respect to the axis of rotation, and against which at least a part of a fastening assembly, by which the brake disk is fastenable or fastened to the wheel hub, bears in the installed state. By contrast to the prior art, the wheel hub according to the invention has an obliquely running contact surface which permits the use of a fastening assembly which is of at least partially conical design or which has a constituent part of conical design. For example, the fastening assembly comprises a cone element in addition to a bolt or a screw with a bolt head or screw head. By means of said cone element, it is advantageously possible to brace the brake disk against the wheel hub. Here, the cone element advantageously assists installation on the wheel hub by virtue of the conical cone element centering the brake disk on the wheel hub and pressing said brake disk against a defined axial stop, that is to say the brake disk abutment surface, whereby highly exact positioning of the brake disk is possible. Furthermore, the cone element braces the brake disk and the wheel hub by virtue of the cone element acting with a spreading-apart action on the wheel hub and on the brake disk in the installed state. A further advantage of the wheel-hub-side contact surface is that a part of the braking torque that arises during operation can be transmitted via the contact surface to the wheel hub, such that the braking torque acts not only in punctiform fashion in the interface region at the brake disk abutment surface between the brake disk and the wheel hub but can additionally be absorbed via the wheel-hub-side contact surface. In particular, the wheel-hub-side contact surface is offset with respect to the brake disk abutment surface by a distance which corresponds at least to an—averaged—thickness, measured in an axial direction in the installed state, of the brake disk in the region of the brake disk abutment surface. Between the brake disk abutment surface and the wheel-hub-side contact surface, the outer side of the wheel hub runs preferably parallel to the axis of rotation. It is furthermore expedient that, in the installed state, the fastening assembly, in particular a shank of the screw or of the bolt, extends through the brake disk and engages into the wheel hub. For example, the fastening assembly comprises, at its end that engages into the wheel hub, a thread which engages into a wheel-hub-side thread of complementary form and which thus ensures the attachment of the brake disk to the wheel hub.

Provision is advantageously made whereby the wheel-hub-side contact surface at least partially delimits the wheel hub in an outward direction—preferably away from the axis of rotation—, in particular perpendicular to the axis of rotation. In this way, it can be achieved that it is easily possible for the fastening assembly, which is intended to come into contact with the wheel-hub-side contact surface in an installed state, to be able to simultaneously also come into contact with a brake disk, such that the bracing of the two components can be realized in a simple manner. Furthermore, by means of this embodiment, it can also be achieved that the fastening assembly effects a positively locking transmission of torque between brake disk and wheel hub, similarly to a parallel key. Here, in this context, "delimiting in an outward direction" may mean that the wheel-hub-side contact surface delimits the wheel hub in certain portions, in particular radially outward in relation to the axis of rotation.

Provision is expediently made whereby the contact surface is inclined relative to the axis of rotation by an angle of between 1° and 30°, preferably between 2° and 25°, and particularly preferably between 5° and 15°. In particular for an angle range between 4° and 10°, it has advantageously been found that a wheel-hub-side contact surface is provided which can be utilized for guiding the brake disk during the mounting thereof and during the accommodation of braking torques, without taking up too much structural space as viewed in a radial direction.

Provision is preferably made whereby the wheel hub narrows in an axial direction toward the end side, in particular toward the end side over which the brake disk is mounted, in order to form the wheel-hub-side contact surface. That region of the wheel hub which narrows toward the end side advantageously serves as a centering aid during the mounting of the brake disk onto the wheel hub. It is advantageous here if the wheel-hub-side contact surface is hardened, surface-treated and/or coated in order to counteract possible damage to the wheel hub during the mounting of the wheel hub. Preferably, the wheel hub is hardened, surface-treated and/or coated only in the region of the wheel-hub-side contact surfaces as viewed in a direction of rotation.

Provision is expediently made whereby a ratio between an averaged thickness, measured in an axial direction, of the brake disk in the region of the brake disk abutment surface to a length, measured in an axial direction, of the wheel-hub-side contact surface assumes a value between 0.3 and 0.9, preferably between 0.4 and 0.8 and particularly preferably between 0.5 and 0.7. In the case of a ratio between 0.5 and 0.7, the direct contact, measured in an axial direction, between the wheel hub and the brake disk is smaller than the contact, measured in an axial direction, between the wheel hub and the fastening assembly. In this way, the interface region between wheel hub and brake disk can advantageously be jointly influenced by means of the characteristics of the fastening assembly, in particular the form thereof. For example, an enlarged contact surface between wheel hub and fastening assembly in relation to a contact surface between wheel hub and brake disk can be utilized in an effective manner for thermal decoupling between the wheel hub and the brake disk, for example by virtue of the material selection of the fastening assembly being correspondingly adapted.

Provision is advantageously made whereby the wheel hub has a collar region which is situated at the outside as viewed in a radial direction, and a core region which is situated at the inside as viewed in a radial direction, wherein, as viewed in an axial direction, the core region situated at the inside is thicker than the collar region situated at the outside, and wherein the wheel hub has, in the core region situated at the inside, the substantially axially running primary cutout for the attachment of a brake disk. In this way, it is advantageously possible for higher bracing forces to be realized, which in turn permit higher braking torques. Furthermore, thermal effects arising from the generation of heat in the brake disk during braking can be compensated more effectively in relation to wheel hubs in which the primary cutouts for the attachment of the brake disk permit shorter clamping lengths. A collar region is basically to be understood to mean an annular-disk-shaped or trim-like termination of the wheel hub. In the installed state of the wheel hub, the collar region forms the outermost circumferential region of the wheel hub, with which the wheel hub preferably terminates as viewed in a radial direction and to one side in an axial direction. The collar region is advantageously designed as an attachment region for a wheel rim, or serves for the arrangement of a wheel rim. For example, the ratio of the radial extent of the collar region to the diameter of the wheel hub assumes a value between 0.1 and 0.3, preferably between 0.15 and 0.25 and particularly preferably between 0.21 and 0.24. Here, in the installed state, the collar region faces toward the visible side of the vehicle. In particular, provision is made whereby the collar region, as viewed in a radial direction, substantially has a constant thickness measured in an axial direction. Here, a thickness is to be understood in particular to mean the extent of the collar region taken up by the collar region rotating about an axis of rotation during operation. Here, any local recesses are disregarded in the determination of the thickness. Provision is furthermore made whereby the core region, as viewed in a radial direction, varies in terms of its axially measured thickness. The core region preferably comprises a central cavity which is provided for receiving an axle element. Here, the core region is provided in particular for abutment against the axle element and, in the installed state, encases the axle element, for example an axle stub, at least in regions. Provision is furthermore preferably made whereby the core region and the collar region directly adjoin one another or transition into one another in a radial direction. Provision is preferably made whereby the ratio of the radial extent of the core region to the diameter of the wheel hub assumes a value between 0.3 and 0.7, preferably between 0.35 and 0.55 and particularly preferably between 0.4 and 0.5. Provision is preferably made whereby the primary cutout is a bore, in particular a through bore. Provision is furthermore preferably made whereby the wheel hub is provided for the attachment of a flat brake disk, for example a brake disk with a thickness of 1 to 5 cm in an axial direction. It is also conceivable for the primary cutout to be arranged in the half facing toward the axis of rotation, preferably in a first third facing toward the axis of rotation, or particularly preferably in a first quarter facing toward the axis of rotation, of the core region or of the wheel hub. In particular, provision is made whereby the wheel hub is of single-piece or integral form, that is to say the wheel hub is not assembled from multiple constituent parts, but rather the brake disk, axle and wheel or wheel rim can be attached to a single-piece component, that is to say the wheel hub. For example, the wheel hub is forged or cast as a single piece.

Provision is preferably made whereby the wheel-hub-side contact surface is assigned a first wheel-hub-side curvature radius in a first section plane and a second wheel-hub-side curvature radius in a second section plane, wherein the first section plane and the second section plane are axially offset with respect to one another and run perpendicular to the axis of rotation, wherein, in the installed state, a distance from the collar region to the first section plane is smaller than a distance from the collar region to the second section plane, wherein the first wheel-hub-side curvature radius is larger than the second wheel-hub-side curvature radius, in particular if the first curvature radius and the second curvature radius each have a central point which, as viewed from the wheel-hub-side contact surface, faces toward the axis of rotation and particularly preferably lies on the axis of rotation. It is however also conceivable for the first curvature radius and the second curvature radius to be assigned a central point which, as viewed in a radial direction from the wheel-hub-side contact surface, faces away from the axis of rotation. This is preferably provided for a wheel-hub-side contact surface which at least regionally encases the fastening assembly and thereby advantageously contributes to positive locking in a direction of rotation between the fastening assembly and the wheel hub. Here, provision is preferably made whereby the first wheel-hub-side curvature radius is smaller than the second wheel-hub-side curvature radius. It is furthermore conceivable that the wheel-hub-side contact surface is discontinuous as viewed in a direction of rotation and, for example, the wheel hub, as viewed in a direction of rotation, for example in the first or second section plane, is hardened, surface-coated or coated only in the wheel-hub-side contact surfaces.

Furthermore, according to the invention, a brake disk is provided, in particular for a utility vehicle, which brake disk rotates about an axis of rotation during operation, comprising a wheel hub abutment surface against which a wheel hub bears in an installed state, and a brake-disk-side contact surface which is offset in an axial direction with respect to the wheel hub abutment surface and which runs obliquely with respect to the axis of rotation, that is to say at an angle not equal to 0°, 90° or 180° with respect to the axis of rotation, and against which at least a part of a fastening assembly, by which the brake disk is fastened to the wheel hub, bears in the installed state. All of the features described for the wheel hub according to the invention, and the advantages thereof, can be analogously likewise transferred to the brake disk according to the invention, and vice versa.

Provision is preferably made whereby the brake-disk-side contact surface is assigned a first brake-disk-side curvature radius in a first section plane and a second brake-disk-side curvature radius in a second section plane, wherein the first section plane and the second section plane are axially offset with respect to one another and run perpendicular to the axis of rotation, wherein, in the installed state, a distance from the collar region to the first section plane is smaller than a distance from the collar region to the second section plane, wherein the first curvature radius is smaller than the second curvature radius. It is conceivable here that the first brake-disk-side curvature radius and the second brake-disk-side curvature radius run coaxially with respect to the axis of rotation or have central points which are offset in a radial direction with respect to the axis of rotation. For example, a ratio between the first brake-disk-side or the second brake-disk-side curvature radius to a curvature radius which is to be assigned to an inner side, which in the installed state faces toward the axis of rotation, of the brake disk assumes a value between 0.01 and 0.4, preferably between 0.05 and 0.3, and particularly preferably between 0.1 and 0.2. It is thereby advantageously possible for the brake-disk-side contact surface of the fastening assembly to be encased at least partially or piecewise, such that advantageously additional positive locking in a direction of rotation between the brake disk and the fastening assembly is possible. Provision is furthermore made whereby the brake-disk-side contact surface is designed such that a curvature radius decreases, preferably decreases in continuous fashion, toward the collar region as viewed in an axial direction.

Provision is advantageously made whereby the brake-disk-side contact surface at least partially delimits the brake disk in an inward direction with respect to the axis of rotation, in particular perpendicular to the axis of rotation. In this way, it can be achieved that it is easily possible for the fastening assembly, which is intended to come into contact with the brake-disk-side contact surface in an installed state, to be able to simultaneously also come into contact with a wheel hub, such that the bracing of the two components can be realized in a simple manner. Furthermore, by means of this embodiment, it can also be achieved that the fastening assembly effects a positively locking transmission of torque between brake disk and wheel hub, similarly to a parallel key. Here, in this context, "delimiting in an inward direction" may mean that the brake-disk-side contact surface delimits the brake disk in certain portions in the direction of the axis of rotation. In particular in such a way that the brake-disk-side contact surface is at least partially inclined toward the axis of rotation. In other words, this may mean that the brake-disk-side contact surface is—as viewed from the axis of rotation—not covered by any other part of the brake disk.

Provision is furthermore preferably made whereby the brake-disk-side contact surfaces are arranged on the inner side of the brake disk at regular intervals as viewed in a direction of rotation. It is also conceivable for the wheel hub to be hardened, surface-treated and/or coated on its inner side in the brake-disk-side contact surfaces or in the region of the brake-disk-side contact surfaces, preferably exclusively in the brake-disk-side contact surfaces or in the region of the brake-disk-side contact surfaces.

Expediently, the brake disk has at least one fastening groove through which a fastening assembly extends in an installed state, wherein the fastening groove is open toward the axis of rotation. It is possible in this way to realize a simple and inexpensive attachment of the brake disk. Furthermore, by means of the fastening groove which is open toward the axis of rotation, it can be achieved that the radial—heat-induced—expansion of the brake disk during operation is not prevented or impeded in positively locking fashion by the fastening assembly. For receiving the fastening assembly, it is therefore expedient if the fastening groove extends in the direction of the axis of rotation. The fastening groove is advantageously designed such that an axial end of the fastening groove adjoins the brake-disk-side contact surface. In this way, a particularly compact and mechanically durable means of attachment for the brake disk can be created.

Likewise provided according to the invention is a fastening assembly for fastening a brake disk to a wheel hub, which rotate about an axis of rotation during operation, wherein the fastening assembly has a fastening-means-side contact surface which runs obliquely with respect to the axis of rotation, that is to say at an angle not equal to 0°, 90° or 180° with respect to the axis of rotation, and against which the wheel hub and/or the brake disk bear in the installed state. All of the features described for the wheel hub according to the invention, and the advantages thereof, can be analogously likewise transferred to the fastening assembly according to the invention, and vice versa. Preferably, the fastening-means-side contact surface has an angle relative to the axis of rotation which corresponds to the angle of the wheel-hub-side contact surface and/or of the brake-disk-element-side contact surface relative to the axis of rotation. Provision is preferably made whereby the fastening assembly narrows at least in regions in an axial direction, wherein the fastening-means-side contact surfaces define the narrowing of the fastening assembly. A fastening assembly is to be understood in particular to mean any component which is provided for the attachment of the brake disk to the wheel hub.

Provision is advantageously made whereby the fastening assembly has a cone element, wherein the cone element provides the fastening-means-side contact surface. The cone element advantageously permits an areal abutment of the fastening assembly against the brake-disk-side contact surface and the wheel-hub-side contact surface. Here, the cone element is preferably designed such that the cone element can be inserted into an intermediate space delimited by wheel hub and brake disk, in particular in an accurately fitting manner, in particular so as to form an interference or clearance fit. Here, the cone element is preferably designed such that, by way of an end side, it terminates flush in an axial direction with the brake disk.

Provision is preferably made whereby the fastening element comprises a cone element designed as a ring segment or as a sleeve. By means of a cone element designed as a ring segment, it is possible for an abutment surface to be provided which is relatively long as viewed in a direction of rotation and at which the brake-disk-side and the wheel-hub-side contact surface and the fastening-means-side contact surface bear against one another. Here, a ring segment of said type can be inserted in an orientation defined by the form of the ring segment. An advantage that arises when using a sleeve is that the sleeve element can be inserted without additional orientation, and an additional positive locking action is generated in a direction of rotation between the fastening assembly and the wheel hub and the brake disk, by virtue of the sleeve element being encased by the brake disk and/or the wheel hub. For this purpose, provision is preferably made whereby the sleeve element is adapted to arcuate recesses in the brake disk and in the wheel hub.

Provision is preferably made whereby the fastening assembly has a cone element which provides a fastening-means-side contact surface measured in an axial direction, wherein a ratio between an extent of the cone element measured in a radial direction to a length of the fastening-means-side contact surface assumes a value between 1 and 2, preferably between 1.2 and 1.6 and particularly preferably between 1.25 and 1.5. It is thus possible for a relatively thick cone element to be used. In this way, by means of the cone element, in particular in the case of a ratio between 1.2 and 1.6, a clamping length of the fastening assembly can advantageously be increased such that an associated increase of the bracing force makes it possible for higher braking torques to be accommodated.

In a further embodiment of the present invention, provision is made whereby the fastening assembly has a screw or a bolt in addition to the cone element, wherein a screw head height of the screw, or bolt head height of the bolt, measured in an axial direction is smaller than the extent of the cone element, in particular of the fastening-means-side contact surface of the cone element, measured in an axial direction. The cone element is advantageously thicker than a screw head height. In this way, a cone element is provided which not only adequately increases the clamping length but additionally also an adequately long fastening-means-side contact surface, which, during the installation process, can be guided along the wheel-hub-side contact surface. It is furthermore conceivable for the cone element to be formed integrally with a screw or a bolt as fastening assembly.

Provision is expediently made whereby the cone element has an internal thread. In this way, a screw, which is for example likewise part of the fastening assembly, can be screwed together with the cone element, whereby a bond between the fastening assembly, the brake disk and the wheel hub can advantageously be further increased. Preferably, the fastening assembly can be introduced from an outer side, or a visible side, of the vehicle into the primary cutout, extend through the wheel hub, and subsequently engage into the cone element in order to fasten the brake disk to the wheel hub.

Furthermore, according to the invention, a system is provided which is composed of a wheel hub, of a fastening assembly and of a brake disk, which rotate about an axis of rotation in the installed state, wherein the wheel hub has a brake disk abutment surface against which a brake disk bears in an installed state, and a wheel-hub-side contact surface which is offset in an axial direction with respect to the brake disk abutment surface and which runs obliquely with respect to the axis of rotation and against which at least a part of a fastening assembly, by which the brake disk is fastened to the wheel hub, bears in the installed state, wherein the brake disk comprises a wheel hub abutment surface against which a brake disk bears in an installed state, and a brake-disk-side contact surface which is offset in an axial direction with respect to the wheel hub abutment surface and which runs obliquely with respect to the axis of rotation and against which at least a part of the fastening assembly, by which the brake disk is fastened to the wheel hub, bears in the installed state, and wherein the fastening assembly has a fastening-means-side contact surface which runs obliquely with respect to the axis of rotation and against which the wheel hub and/or the brake disk bear in the installed state. All of the features described for the wheel hub or brake disk according to the invention or the fastening assembly according to the invention, and the advantages thereof, can be analogously likewise transferred to the system according to the invention, and vice versa.

Provision is advantageously made whereby the brake-disk-side contact surface and/or wheel-hub-side contact surface are designed such that, in the installed state, the brake-disk-side contact surface and/or the wheel-hub-side contact surface runs parallel to the fastening-means-side contact surface. In this way, it is possible to provide the largest possible abutment surface at which the fastening-means-side contact surfaces bear against the wheel-hub-side and brake-disk-side contact surfaces.

Provision is expediently made whereby the brake-disk-side contact surface, the wheel-hub-side contact surface and/or the fastening-means-side contact surface are delimited in an axial direction by edges. That is to say, the respective contact surfaces are each terminated with an edge, and/or, in the region between the edges, in each case one planar surface is provided for forming the brake-disk-side contact surface, the wheel-hub-side contact surface and/or the fastening-means-side contact surface. Here, provision is particularly preferably made whereby the wheel-hub-side, the brake-disk-side and/or the fastening-means-side contact surface are closed, that is to say has no recesses or structurings.

Provision is preferably made whereby, in the installed state, the fastening-means-side contact surfaces are arranged in a radial direction between the brake-disk-side contact surface and the wheel-hub-side contact surface.

BRIEF DESCRIPTION OF THE DRAWINGS

Further advantages and features will emerge from the following description of preferred embodiments of the subject matter according to the invention with reference to the appended figures. In the figures.

DETAILED DESCRIPTION OF THE PREFERRED EMBODIMENT

Figure 1A:
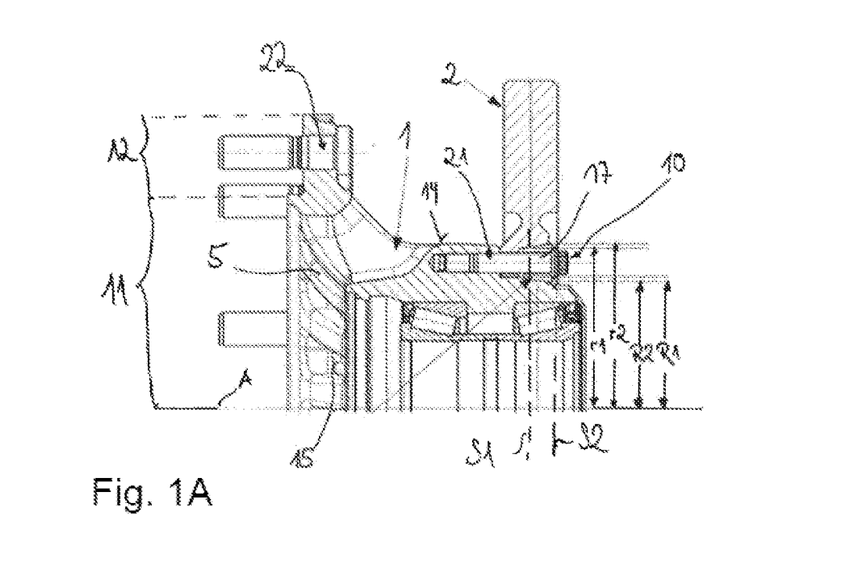
FIG. 1A shows a wheel hub according to a first exemplary embodiment of the present invention.
Figure 1B:
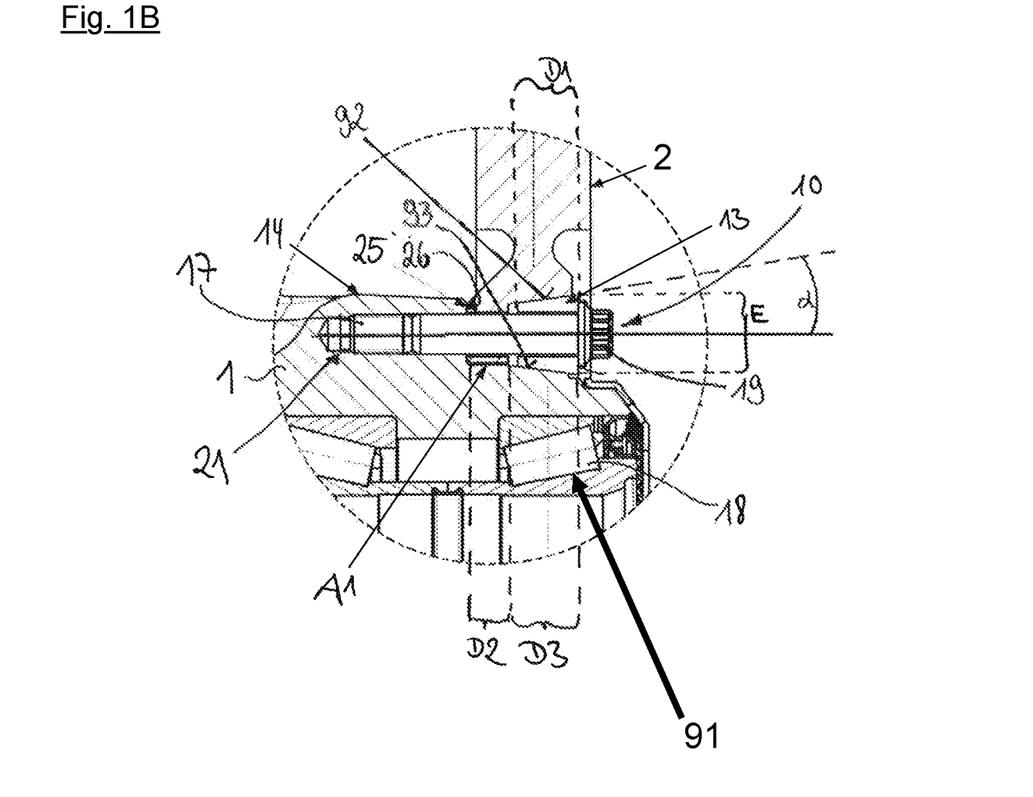
FIG. 1B shows an enlarged area of the wheel hub.

FIGS. 1A and 1B illustrate a wheel hub 1 according to a first exemplary embodiment of the present invention in a sectional view. A wheel hub 1 of said type serves for fastening a wheel to an axle element, for example to a stub, to a shaft or to an axle. In particular, the wheel hub 2 is mounted rotationally on the axle by means of a rolling bearing with rolling bodies 18. Aside from the attachment of the wheel, provision is furthermore made whereby a brake disk 2 is connected rotationally conjointly to the wheel hub 1. This is preferably a wheel hub 1 for a utility vehicle. In particular, provision is made whereby the wheel hub 1 is formed as a single piece or of integral form. That is to say, on the single-piece wheel hub 1, there are provided both primary cutouts 21 for the attachment of the brake disk 2 to the wheel hub 1 and secondary cutouts 22 for the attachment of the wheel to the wheel hub 1. Major constituent parts of the wheel hub 1 of integral form are a collar region 12, which is situated at the outside as viewed in a radial direction, and a core region 11, which is situated at the inside as viewed in a radial direction, wherein the core region 11 is thicker than the collar region 12. The collar region 12 is preferably of substantially annular-disk-shaped form, that is to say a thickness of the collar region 12 measured in an axial direction is substantially constant as viewed in a radial direction in the collar region 12. By contrast to the collar region 12, the thickness of the core region 11 measured in an axial direction changes with increasing radial distance from the axis of rotation A. Preferably, the thickness of the core region 11 is at a maximum in the region in which the wheel hub 1 bears against the axle element in the installed state. Provision is preferably made whereby the core region 11 has substantially radially extending rib elements 5, wherein a clear region 15 forms between two adjacent rib elements 5. In particular, provision is made whereby the rib elements 5 are designed such that, as viewed in an axial direction, they run, in regions, parallel to the axis of rotation A and are curved radially outward toward the collar region 12. In this way, the wheel hub 1 widens radially as viewed in an axial direction. Provision is furthermore preferably made whereby the rib element 5, by way of a first end, directly adjoins the collar region 12 and, by way of a second end, transitions into the region in which the rib element 5 forms an outer lateral surface 14 running parallel to the axis of rotation A.

In particular, provision is made whereby the primary cutout 21, by means of which the brake disk 2 is attached to the wheel hub 1, is arranged in the core region 11, preferably in a region which is situated between the axis of rotation A and the outer lateral surface 14. Here, the primary cutout 21 runs substantially axially. By means of the arrangement of the primary cutout 21 in the relatively thick core region 11, it is advantageously possible to generate greater clamping lengths than if the primary cutout 21 for the attachment of the brake disk 2 is arranged in the collar region 12. This increased clamping length is advantageously associated with an increased bracing force, which ultimately permits higher braking torques. Furthermore, thermal effects can be compensated in a relatively effective manner by means of this structural arrangement of the primary cutouts 21.

Furthermore, in the embodiment illustrated in FIGS. 1A and 1B, provision is made whereby the core region 11 has a brake disk abutment surface 25 in which the primary cutout 21 opens out. In the installed state, the brake disk 2 bears against the brake disk abutment surface 25 and is attached via said brake disk abutment surface 25 to the wheel hub 1. In particular, provision is made whereby the wheel hub 1 has a wheel-hub-side contact surface 91 offset in an axial direction with respect to the brake disk abutment surface 25. In particular, the wheel-hub-side contact surface 91 is offset axially relative to the brake disk abutment surface 25 in a direction facing away from the collar region 11 or the rib elements 5. Provision is for example made whereby a ratio between a thickness D2, measured in an axial direction, of the brake disk 2 in the region of the brake disk abutment surface 25 to a length D3, measured in an axial direction, of the wheel-hub-side contact surface 91 assumes a value between 0.3 and 0.9, preferably between 0.4 and 0.8 and particularly preferably between 0.5 and 0.7. Preferably, a distance between the brake disk abutment surface 25 and the wheel-hub-side contact surface 91 is dimensioned such that, in the installed state, a part of the brake disk 2 is arranged between the wheel-hub-side contact surface 91 and the brake disk abutment surface 25 in an axial direction. Preferably, the wheel-hub-side contact surface 91 is designed so as to run obliquely with respect to the axis of rotation A, in particular so as to be obliquely inclined by an angle α between 1° and 30°, preferably between 2° and 25°, and particularly preferably between 4° and 10°. In particular, the angle α is adapted to a fastening-side contact surface 93 of a fastening assembly 10, or of a part of a fastening assembly 10, by which the brake disk 2 is fixed to the wheel hub 1 in the installed state. In the exemplary embodiment illustrated, provision is made whereby the fastening-means-side contact surface 93 is provided by a cone element 13. In this way, a conically shaped cone element 13 can be used, by means of which a clamping length for the entire fastening assembly 10 or the system composed of brake disk 2, fastening assembly 10 and wheel hub 1 can advantageously be further increased. Provision is preferably made whereby a ratio between an extent E, measured in a radial direction, of the washer 10 to a length D1 of the fastening-means-side contact surface 93 assumes a value between 0.65 and 0.95, preferably between 0.75 and 0.93, and particularly preferably between 0.82 and 0.92. In other words: A relatively thick cone element 13 is provided. As a result, higher braking torques can be accommodated by the fastening assembly 10. This in some cases permits a reduction of the number of provided attachment points by which the brake disk 2 is connected to the wheel hub 1. Provision is furthermore made whereby the brake disk 2 has a wheel hub abutment surface 26, against which the wheel hub 1 bears in an installed state, and a brake-disk-side contact surface 92 which is offset in an axial direction with respect to the wheel hub abutment surface 26 and which runs obliquely with respect to the axis of rotation A and against which at least a part of the fastening assembly 10, by which the brake disk 2 is fastened to the wheel hub 1, bears in the installed state. In particular, in the installed state, the cone element 13 is arranged between the wheel hub 1 and the brake disk 2 as viewed in a radial direction. It is furthermore conceivable for the fastening-means-side contact surface 93, which is in contact with the wheel hub 1, to be larger than the wheel hub abutment surface 26. In this way, it is possible, for example through corresponding material selection of the cone element 13, to reduce a thermal coupling between the wheel hub 1 and the brake disk 2. For example, the material from which the cone element is manufactured exhibits reduced thermal conductivity in relation to the wheel hub 1, such that a transfer of the heat from the brake disk 2 to the wheel hub 1 via the cone element 13 is reduced.

Provision is furthermore made whereby the brake-disk-side contact surface 92 is to be assigned a first brake-disk-side curvature radius r1 in a first section plane S1 and is to be assigned a second brake-disk-side curvature radius r2 in a second section plane S2, wherein the first section plane S1 and the second section plane S2 are offset with respect to one another in an axial direction and run perpendicular to the axis of rotation A. In particular, the first section plane S1 is arranged closer to the collar region 11 than the second section plane S2. Furthermore, the wheel-hub-side contact surface 91 is to be assigned a first wheel-hub-side curvature radius R1 in the first section plane S1 and a second wheel-hub-side curvature radius R2 in the second section plane S2. Here, the first and the second brake-disk-side curvature radius r1 and r2 and the wheel-hub-side curvature radius R1 and the second wheel-hub-side curvature radius R2 run concentrically with respect to the axis of rotation A. Provision is furthermore preferably made whereby the first brake-disk-side curvature radius r1 is smaller than the second brake-disk-side curvature radius r2. At the same time, in the embodiment illustrated, the first wheel-hub-side curvature radius R1 is greater than the second wheel-hub-side curvature radius R2.

Figure 2:
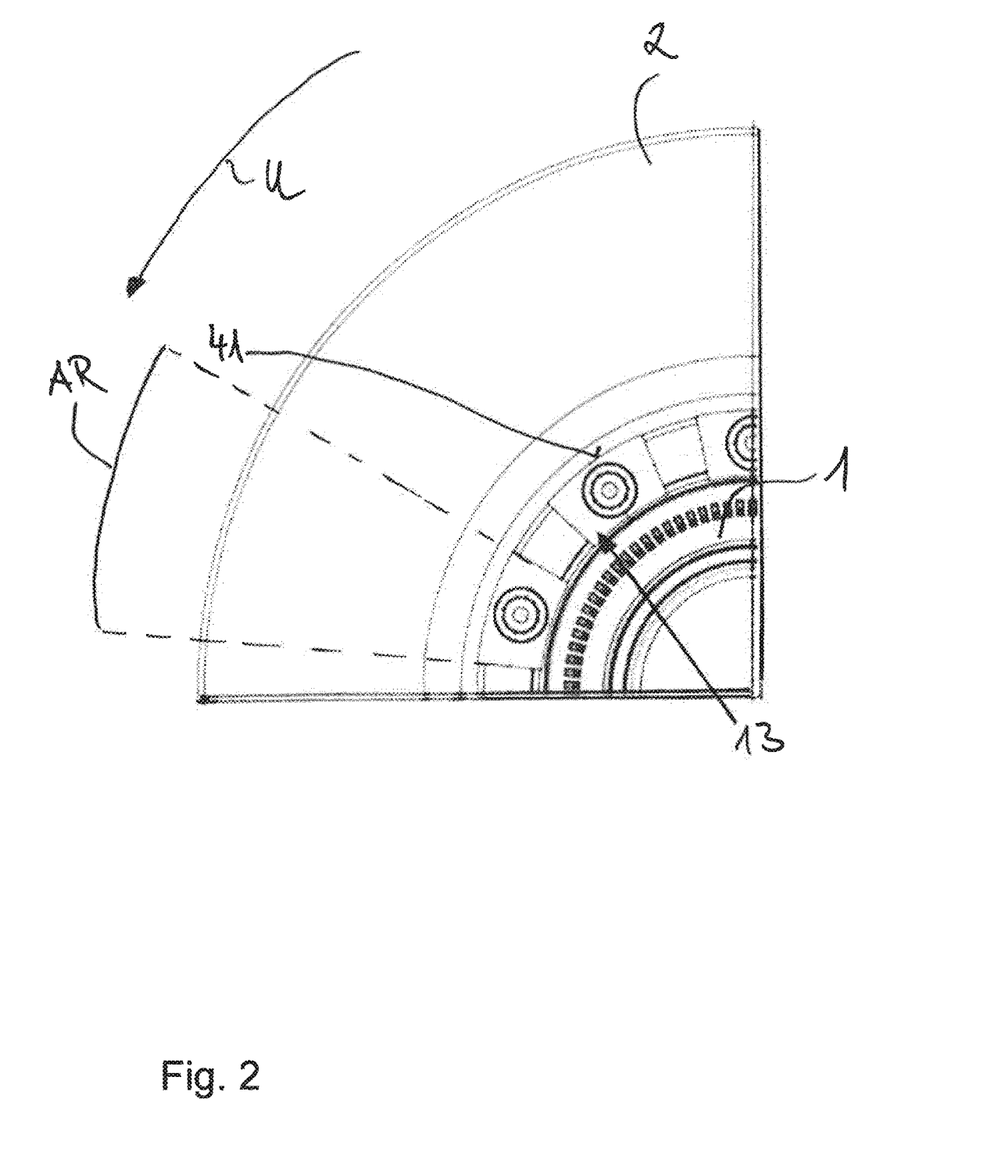
FIG. 2 shows a plan view of a detail of a system composed of wheel hub, brake disk and fastening assembly according to a first exemplary embodiment of the present invention.

FIG. 2 illustrates a plan view of a detail of a system composed of wheel hub 1, brake disk 2 and fastening assembly 10. In particular, the system is that which is illustrated in a sectional view in FIGS. 1A and 1B. Here, provision is made whereby the cone elements 13 are of ring-segment-shaped form as viewed in a direction of rotation U. The cone elements 13 preferably extend in a direction of rotation U to such an extent that, in the installed, a screw head or bolt head of the fastening assembly lies on the cone element 13. It is also conceivable that an outer circumference 41 of the cone element 13 is assigned an outer radius AR, and a ratio between a radial extent of the cone element 13 to the outer radius AR assumes a value between 0.5 and 0.9, preferably between 0.6 and 0.75, and particularly preferably between 0.63 and 0.72.

Figure 3:
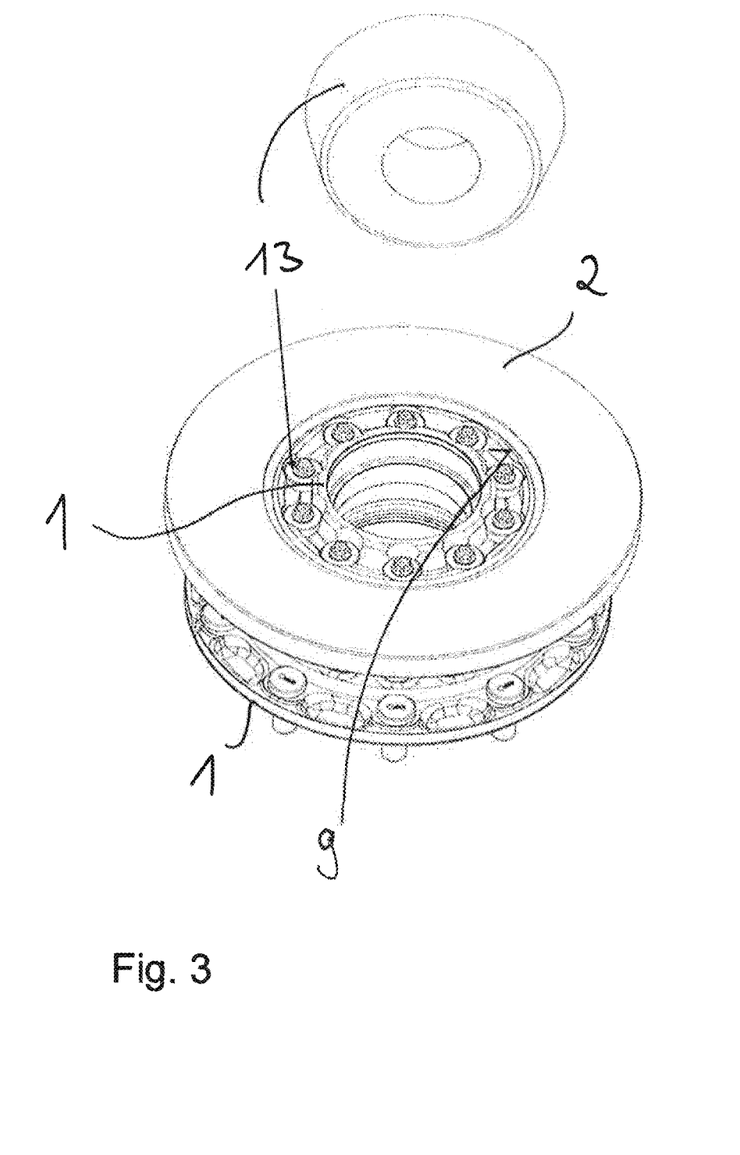
FIG. 3 shows a perspective view of a system composed of wheel hub, brake disk and fastening assembly according to a second exemplary embodiment of the present invention.

FIG. 3 illustrates a perspective view of a system composed of wheel hub 1, brake disk 2 and fastening assembly 10 according to a second exemplary embodiment of the present invention. The washer 13 of the fastening assembly 10 is additionally illustrated on the right-hand side. Here, the system differs in relation to that from FIG. 1 substantially only by the form of the cone element 13. Instead of a ring-segment-shaped washer element 13, a sleeve-shaped cone element 13 is provided. The wheel-hub-side contact surface 91 and the brake-disk-side contact surface 92 are likewise curved correspondingly to the form of the cone element 13. In particular, the core region 11, at its outer side, comprises a cutout or a recessed profile in order to form the wheel-hub-side contact surface 91, in order that the wheel hub 1 does not have to be extended in a radial direction for the use of the cone element 13.

In particular, provision is made whereby an inner side 9, situated at the inside as viewed in a radial direction, of the brake disk 2 has a curved brake-disk-side contact surface 92 at regular intervals as viewed in a direction of rotation U. Here, each of the brake-disk-side contact surfaces 92 is to be assigned a first brake-disk-side curvature radius r1 and a second brake-disk-side curvature radius r2, wherein the first brake-disk-side curvature radius r1 and the second brake-disk-side curvature radius r2 run non-concentrically with respect to the axis of rotation A, and are smaller than an inner-side radius which is to be assigned to the general course of the inner side 9 of the brake disk 2. Preferably, the brake-disk-side curvature radius of the brake-disk-side contact surface 92 narrows in the direction of the collar region 11, preferably in continuous fashion, such that the second brake-disk-side curvature radius r2 is smaller than the first brake-disk-side curvature radius r1. Provision is furthermore made whereby a central point which is to be assigned to the wheel-hub-side curvature radius R1, R2 is arranged on that side of the wheel-hub-side contact surface which is averted from the axis of rotation A. Correspondingly, in the embodiment illustrated, the second wheel-hub-side curvature radius R2 is smaller than the first wheel-hub-side curvature radius R1.

Figure 4:
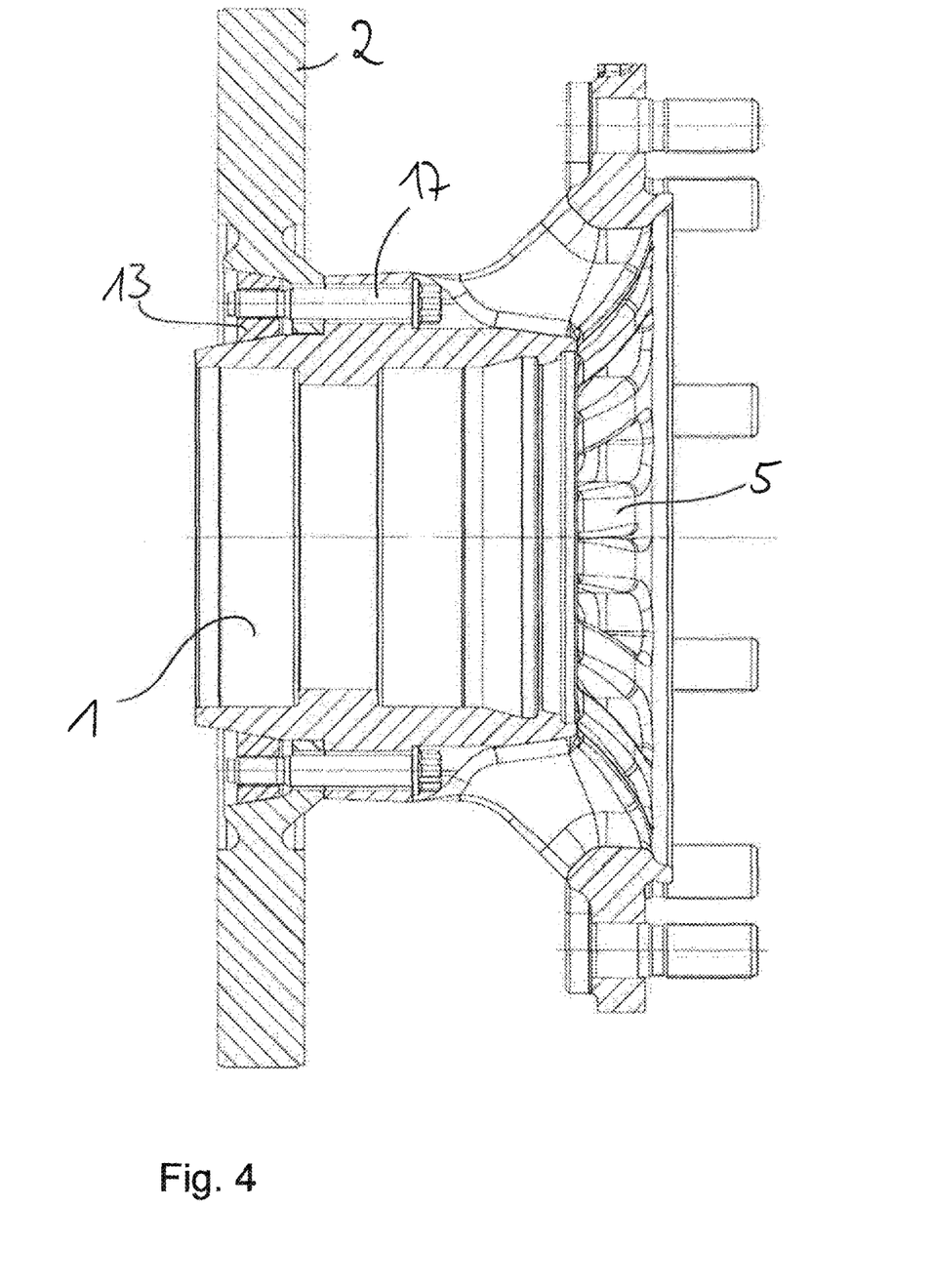
FIG. 4 shows a sectional view of a detail of a system composed of wheel hub, brake disk and fastening assembly according to a third exemplary embodiment of the present invention.

FIG. 4 illustrates a sectional view of a detail of the system composed of wheel hub 1, brake disk 2 and fastening assembly 10 according to a third exemplary embodiment of the present invention. Here, the illustrated embodiment differs from that of FIGS. 1 to 3 substantially in that the cone element 13 has a thread, in particular an internal thread. It is thereby possible for a screw 17 to be led through the wheel hub 1 proceeding from an outer side, that is to say a visible side, of the vehicle, and connected to the thread of the cone element 13. In this way, the screw head 19 can be arranged on the side facing toward the collar region, such that, on the side averted from the collar region, as compact as possible an interface between wheel hub and brake disk can be provided.

Figure 5:
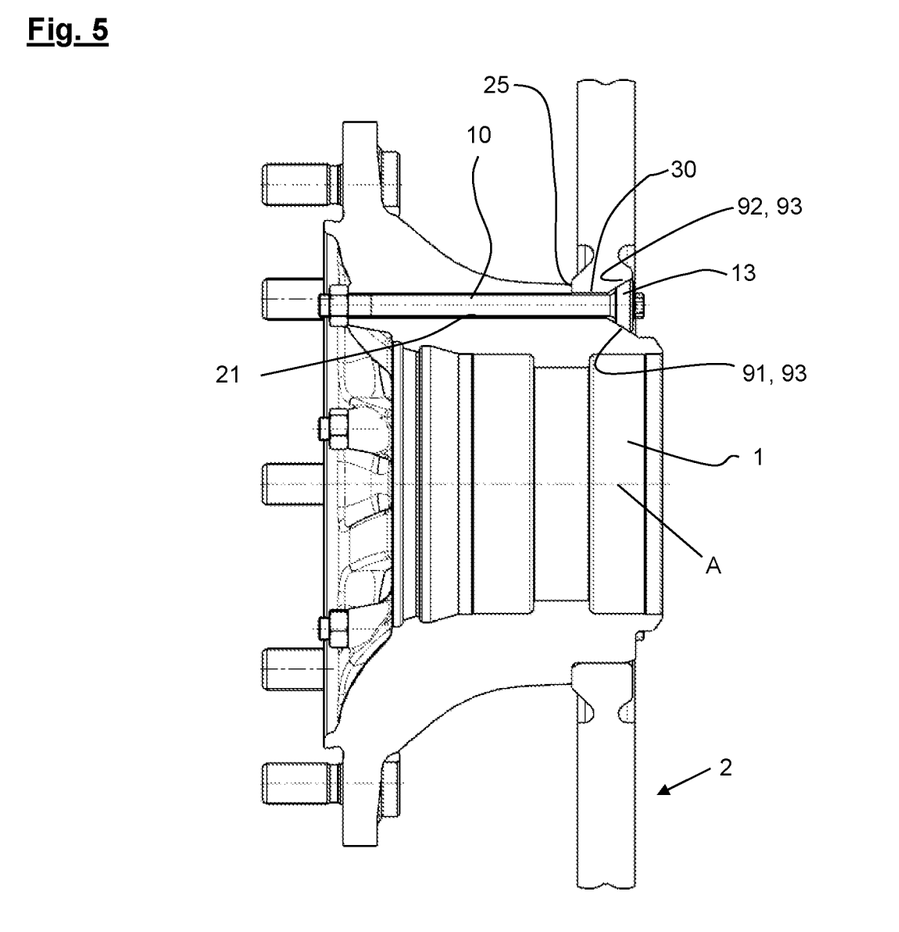
FIG. 5 shows a sectional view of a system composed of a wheel hub, brake disk and fastening assembly according to a fourth exemplary embodiment of the present invention.

FIG. 5 illustrates a sectional view of a detail of the system composed of wheel hub 1, brake disk 2 and fastening assembly 10 according to a fourth exemplary embodiment of the present invention. The wheel hub 1 illustrated in FIG. 5 has a receptacle for a wheel bearing and has a conical wheel-hub-side contact surface 91, which at least partially delimits the wheel hub 1 in an outward direction. In the installed state, at least a part of a fastening assembly 10, by which the brake disk 2 is fastened to the wheel hub 1, is fastened to said wheel-hub-side contact surface 91.

The wheel hub 1 has a multiplicity of primary cutouts 21 which extend all the way through the wheel hub 1 in a direction of the axis of rotation A. In the primary cutouts 21, there is situated in each case one fastening assembly 10, which in the embodiment illustrated is formed by multiple components.

Firstly, the fastening assembly 10 has a nut, which braces the fastening assembly 10 against the wheel hub 1 on one side. On the other side, the fastening assembly 10 has a cone element 13. Here, the cone element 13 has a fastening-side contact surface 93.

The fastening-side contact surface 93 makes contact both with the wheel-hub-side contact surface 91 and with the brake-disk-side contact surface 92, in order to thereby center the brake disk 2 on the hub 1 and also brace the two components together. Additionally, this type of embodiment also offers the advantage that, by means of the cone element 13, it is also still possible for a torque to be transmitted in positively locking fashion about the axis of rotation A from the wheel hub 1 to the brake disk 2—or vice versa.

In the embodiment illustrated, the brake-disk-side contact surface 93 at least partially delimits the brake disk 2 in an inward direction toward the axis of rotation A. In the direction of the axis of rotation A, a fastening groove 30 is situated directly adjacent to the brake-disk-side contact surface 92, which fastening groove is open toward the axis of rotation A and through which fastening groove the fastening assembly 10 extends. By way of said fastening assembly 10, the brake disk 2 is brought to bear against the brake disk abutment surface 25, or is braced against the latter.

Figure 6:
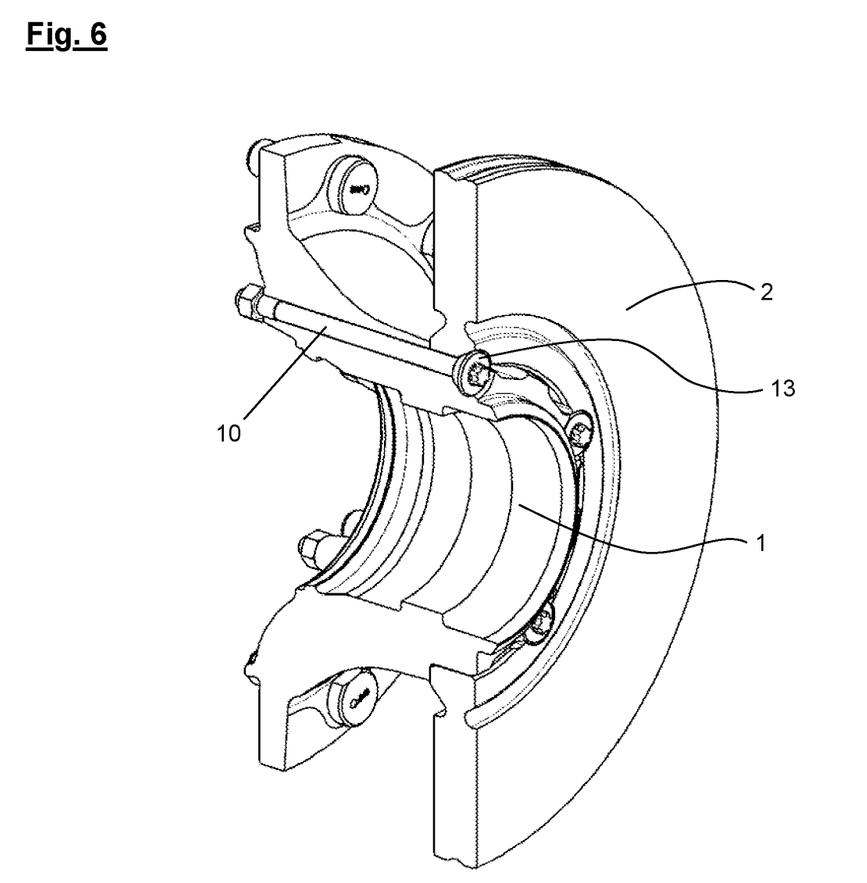
FIG. 6 shows a perspective sectional view of a system composed of a wheel hub, brake disk and fastening assembly according to a further exemplary embodiment of the present invention.

FIG. 6 shows a perspective sectional view of a system composed of a wheel hub 1, brake disk 2 and fastening assembly 10 according to a further exemplary embodiment of the present invention. The embodiment shown in FIG. 6 may for example represent a different view in relation to the embodiment shown in FIG. 5.

In the embodiment shown in FIG. 6, the fastening assembly 10 extends all the way through the wheel hub 1, wherein the fastening assembly has a nut at one distal end thereof and has a cone element 13 at the other distal end thereof.

By means of said cone element 13, the brake disk 2 is braced against the wheel hub 1, and it is additionally still possible for a torque to be transmitted in positively locking fashion between the brake disk 2 and the wheel hub 1. Said cone element 13 can therefore act similarly to a parallel key and simultaneously also impart a bracing action.

To realize a reliable transmission of torque, a multiplicity of fastening assembly 10 is arranged around the circumference of the system composed of wheel hub 1 and brake disk 2.

REFERENCE DESIGNATIONS

1 Wheel hub
2 Brake disk
5 Rib element

9 Inner side
10 Fastening assembly
11 Core region
12 Collar region
13 Cone element
14 Outer lateral surface
15 Clear region
17 Screw
18 Rolling body
19 Screw head
21 Primary cutout
22 Secondary cutout
25 Brake disk abutment surface
26 Wheel hub abutment surface
30 Fastening groove
91 Wheel-hub-side contact surface
92 Brake-disk-side contact surface
93 Fastening-means-side contact surface
A Axis of rotation
α Angle
AR Outer radius
D1 Length of the fastening-means-side contact surface
D2 Thickness of the brake disk in the region of the brake disk abutment surface
D3 Length of the wheel-hub-side contact surface
E Radial extent of the cone element
U Direction of rotation
R1 First wheel-hub-side curvature radius
R2 Second wheel-hub-side curvature radius
r1 First brake-disk-side curvature radius
r2 Second brake-disk-side curvature radius

The invention claimed is:

1. A wheel hub for a utility vehicle, where the wheel hub rotates about an axis of rotation during operation, comprising:
a brake disk abutment surface against which a brake disk bears in an installed state; and
a wheel-hub-side contact surface which is offset in an axial direction with respect to the brake disk abutment surface and which runs obliquely with respect to the axis of rotation and against which at least a part of a fastening assembly bears in the installed state, wherein the brake disk is fastened to the wheel hub by the fastening assembly, wherein the wheel-hub-side contact surface at least partially delimits the wheel hub in an outward direction, wherein the fastening assembly has a screw or a bolt in addition to a cone element.

2. The wheel hub as claimed in claim 1, wherein the wheel-hub-side contact surface is inclined relative to the axis of rotation by an angle between 1° and 30°.

3. The wheel hub as claimed in claim 2, wherein the wheel hub narrows in an axial direction toward an end side of the wheel hub in the axial direction in order to form the wheel-hub-side contact surface.

4. The wheel hub as claimed in claim 3, wherein a ratio between a thickness of the brake disk in the region of the brake disk abutment surface measured in an axial direction to a length of the wheel-hub-side contact surface measured in the axial direction is between 0.3 and 0.9.

5. The brake disc as claimed in claim 4, wherein the ratio is between 0.4 and 0.8.

6. The brake disc as claimed in claim 5, wherein the ratio is between 0.5 and 0.7.

7. The wheel hub as claimed in claim 4, further comprising:
a collar region which is situated at the outside as viewed in a radial direction; and
a core region which is situated at the inside as viewed in a radial direction;
wherein, as viewed in an axial direction, the core region situated at the inside is thicker than the collar region situated at the outside; and
wherein the wheel hub has, in the core region situated at the inside, the attachment of the brake disk.

8. The wheel hub as claimed in claim 2, wherein the angle is between 2° and 25°.

9. The wheel hub as claimed in claim 8, wherein the angle is between 4° and 10°.

10. The wheel hub as claimed in claim 1, wherein a ratio between a thickness of the brake disk in the region of the brake disk abutment surface measured in an axial direction to a length of the wheel-hub-side contact surface measured in the axial direction is between 0.3 and 0.9.

11. The brake disc as claimed in claim 10, wherein the ratio is between 0.4 and 0.8.

12. The brake disc as claimed in claim 11, wherein the ratio is between 0.5 and 0.7.

13. The wheel hub as claimed in claim 1, wherein the wheel hub narrows in an axial direction toward an end side in order to form the wheel-hub-side contact surface.

14. The wheel hub as claimed in claim 1, further comprising:
a collar region which is situated at the outside as viewed in a radial direction; and
a core region which is situated at the inside as viewed in a radial direction;
wherein, as viewed in an axial direction, the core region situated at the inside is thicker than the collar region situated at the outside; and
wherein the wheel hub has, in the core region situated at the inside, for the attachment of the brake disk.

15. A brake disk for a utility vehicle, where the brake disk rotates about an axis of rotation during operation, comprising:
a wheel hub abutment surface against which a wheel hub bears in an installed state; and
a brake-disk-side contact surface which is offset in an axial direction with respect to the wheel hub abutment surface and which runs obliquely with respect to the axis of rotation and against which at least a part of a fastening assembly bears in the installed state, wherein the brake disk is fastened to the wheel hub by the fastening assembly, wherein the brake-disk-side contact surface at least partially delimits the brake disk in an inward direction toward the axis of rotation, and wherein the fastening assembly has a screw or a bolt in addition to a cone element.

16. The brake disk as claimed in claim 15, wherein the brake disk has at least one fastening groove through which the fastening assembly extends in an installed state, wherein the fastening groove is open toward the axis of rotation.

17. A brake system comprising:
a wheel hub;
a fastening assembly; and
a brake disk which rotates about an axis of rotation in the installed state;
wherein the wheel hub comprises:
a brake disk abutment surface against which a brake disk bears in an installed state; and
a wheel-hub-side contact surface which is offset in an axial direction with respect to the brake disk abutment surface and which runs obliquely with respect to the axis of rotation and against which at least a part of a fastening assembly bears in the installed state, wherein the brake disk is fastened to the wheel hub by the fastening assembly, wherein the wheel-hub-side contact surface at least partially delimits the wheel hub in an outward direction;

wherein the brake disk comprises:

a wheel hub abutment surface against which a wheel hub bears in an installed state; and a brake-disk-side contact surface which is offset in an axial direction with respect to the wheel hub abutment surface and which runs obliquely with respect to the axis of rotation and against which at least a part of the fastening assembly bears in the installed state, wherein the brake-disk-side contact surface at least partially delimits the brake disk in an inward direction toward the axis of rotation, and wherein the fastening assembly has a screw or a bolt in addition to a cone element; and wherein the fastening assembly has a fastening-means-side contact surface which runs obliquely with respect to the axis of rotation and against which the wheel hub and/or the brake disk bear in the installed state.

18. The brake system as claimed in claim 17, wherein the brake-disk-side contact surface and/or wheel-hub-side contact surface are configured such that, in the installed state, the brake-disk-side contact surface and/or the wheel-hub-side contact surface runs parallel to the fastening-means-side contact surface.

* * * * *

UNITED STATES PATENT AND TRADEMARK OFFICE
CERTIFICATE OF CORRECTION

PATENT NO. : 11,590,796 B2
APPLICATION NO. : 16/628575
DATED : February 28, 2023
INVENTOR(S) : Stefan Wallmeier and Ralf Aumüller It is certified that error appears in the above-identified patent and that said Letters Patent is hereby corrected as shown below:

In the Specification

Column 2, Line 18:
"—," should be — — —

Column 8, Line 10:
"surface" should be — surfaces —

Column 11, Line 6:
After "installed" insert -- state --

Column 11, Line 7:
After "assembly" insert -- 10 --

In the Claims

Column 13, Claim 1, Line 33:
"where" should be — wherein —

Column 13, Claim 5, Line 60:
"disc" should be — disk —

Column 13, Claim 6, Line 62:
"disc" should be — disk —

Column 14, Claim 11, Line 17:
"disc" should be — disk —

Column 14, Claim 12, Line 19:
"disc" should be — disk —

Signed and Sealed this
Second Day of January, 2024

Katherine Kelly Vidal
*Director of the United States Patent and Trademark Office*